Nov. 4, 1924.

H. G. KNODERER

ARMORED CONDUCTOR

Filed Jan. 26, 1921

1,514,292

Inventor:
Homer G. Knoderer
by Albert G. Davis
His Attorney.

Patented Nov. 4, 1924.

1,514,292

UNITED STATES PATENT OFFICE.

HOMER G. KNODERER, OF ENGLEWOOD, NEW JERSEY, ASSIGNOR TO GENERAL ELECTRIC COMPANY, A CORPORATION OF NEW YORK.

ARMORED CONDUCTOR.

Application filed January 26, 1921. Serial No. 440,133.

*To all whom it may concern:*

Be it known that I, HOMER G. KNODERER, a citizen of the United States, residing at Englewood, in the county of Bergen, State of New Jersey, have invented certain new and useful Improvements in Armored Conductors, of which the following is a specification.

The present invention relates to armored conductors for use in electrical wiring and particularly to such conductors which are especially intended for surface extensions. It is desirable that such armored conductors be light in weight and easily bent to turn corners, but at the same time sufficiently strong and stiff so they may be strung and fastened at spaced points without sagging. It is furthermore desirable that the structure be such that the armor may be stripped or pierced readily for connecting a lead to the conductors.

The object of my invention is to provide an improved structure in armored conductors which possesses all the above enumerated desirable features and for a consideration of what I believe to be novel and my invention, attention is directed to the accompanying description and the claims appended thereto.

Figure 1:
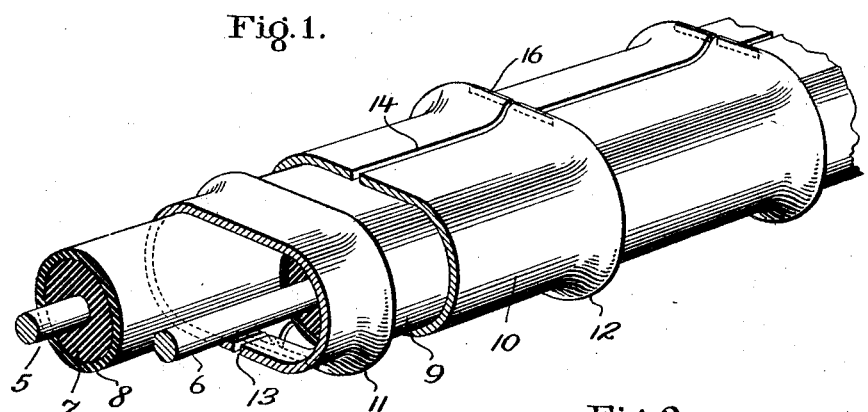
Figure 3:
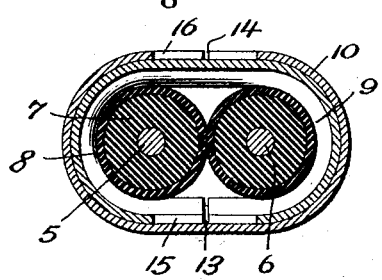
Figure 2:
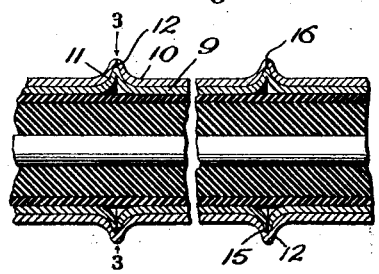
Figure 4:
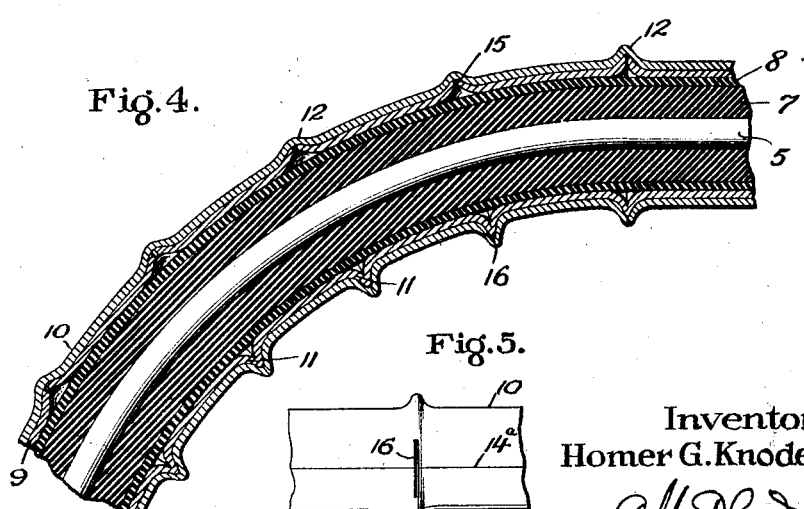
Figure 5:
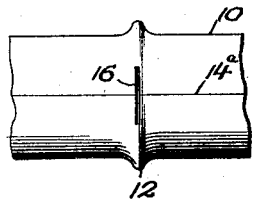

In the drawing, which is made on an enlarged scale, for example, about ten times actual size, Fig. 1 is a perspective view of a length of armored conductor embodying my invention; Fig. 2 is a longitudinal sectional view; Fig. 3 is a transverse section on line 3—3, Fig. 2; Fig. 4 is a longitudinal sectional view illustrating a length of conductor bent to turn a corner, and Fig. 5 is a plan view of a modification.

Referring to the drawing, 5 and 6 indicate two conductors covered with suitable insulating material, for example, with rubber insulation 7 and braid 8. These may be taken as typical of any insulated conductors.

Now, according to my invention I enclose insulated conductors 5 and 6 in a metal armor comprising an inner armor member 9 and an outer armor member 10. Members 9 and 10 are of like structure and at spaced distances along their lengths they are provided with circumferentially extending struck out beads 11 and 12 respectively. The two walls which form the struck out beads 11 of the inner member extend at a small angle to each other and are somewhat rounded, coming to a point at their outer ends, and the two walls which form the struck out beads 12 of the outer member are shaped to receive the walls of struck out beads 11, so they are nested in each other. Members 9 and 10 may be made from strips of flat stock which after being provided with the struck out beads 11 and 12 are wrapped around the conductors 5 and 6. The conductors may be laid side by side longitudinally of the strip which is to form the inner armor member 9 and such strip is then bent around the conductors to bring its side edges together. This leaves a longitudinally extending joint 13. The structure thus formed may be then laid longitudinally of the strip which is to form the outer armor member 10, joint 13 being next to such strip, and the strip bent around to bring its side edges together forming a joint 14 which is on the side opposite to joint 13. It will be understood of course that the armored conductor will be made preferably with suitable automatic machinery and that the process may be continuous. Joints 13 and 14 may be abutting or they may be joined by suitable mechanical means or by welding. In Fig. 5 I have illustrated an arrangement wherein the joint 14$^a$ is welded.

Struck out beads 11 and 12 form a flexible yielding means which permits the armored conductors to be bent to turn a corner, for example, as illustrated in Fig. 4. When bent, the portions of the beads on the outside of the bend spread, while the portions on the inside of the bend are squeezed together.

In the use of armored conductors of this type it is necessary to be able to open the armor or remove a section of it to expose the conductors so a fixture or a lead may be connected to them. To enable this to be done readily, I provide slots 15 and 16 in the inner and outer armor members respectively which slots are preferably located in the beads 11 and 12 and extend inwardly from joints 13 and 14 a suitable distance. With this arrangement when it is desired to open up the armor at any point, a screw driver or other suitable instrument may be inserted first into slots 16 to raise up a portion of the outer armor member so it can be grasped with a pair of plyers or other suitable instrument and torn around. This then bares the inner armor member a section of which can be removed in a similar manner thereby exposing the conductors. In this connection it is pointed out that when beads 11 and 12 are formed the metal is stretched more or less and becomes thinner along the crown of the beads; also, the bending of the metal at the crown of the beads weakens it somewhat along the bend and, as a result, it will tear easily along the bend and leave a fairly smooth edge. If found desirable, I may further weaken the metal along the bend by removing some of it, or I may provide additional weakened places extending around the armor, but ordinarily I prefer the arrangement shown in the drawing.

My improved armored conductor structure is well adapted for surface extensions such as wiring along the surfaces of ceilings or walls where the wiring is exposed and where it is desirable to support it at spaced points only. While the two armor coverings are relatively thin, by reason of the arrangement shown the conductor structure is sufficiently stiff so it will not sag even when fastened only at points spaced a considerable distance apart. However, the structure may be bent readily to turn a corner and is capable of a fairly sharp bend without disrupting the armor, kinking it inwardly, or disrupting or injuring the insulation of the conductor or conductors. Also the armored conductor structure when installed presents a pleasing structural appearance to the eye, a thing of primary importance in open wiring. It will be understood, of course, that the structure is not limited in use to surface wiring but may be used for concealed wiring and is well adapted to be embedded in plaster or other similar material.

In accordance with the provisions of the patent statutes, I have described the operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

In a wiring structure, the combination of conductors laid side by side and insulated from each other and an armor thereon comprising transversely corrugated metal strips folded lengthwise around the conductors, the joints between the strips being out of alignment, and said strips being bent closely around the conductors to form a flattened structure which is stiff in a transverse plane but may be readily bent in a plane at a right angle thereto.

In witness whereof, I have hereunto set my hand this 24th day of January, 1921.

HOMER G. KNODERER.